Dec. 13, 1966 M. A. USAB 3,291,670
METHOD OF MAKING PLASTIC PIPE FITTINGS
Filed Dec. 2, 1965 2 Sheets-Sheet 1
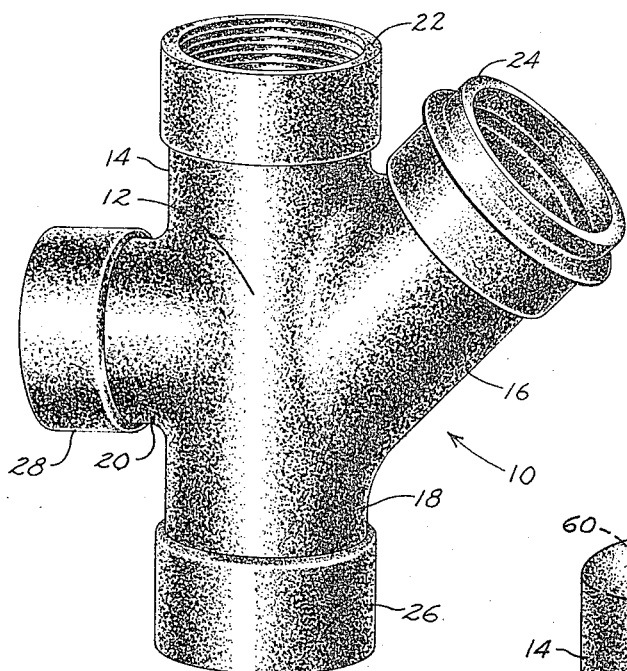
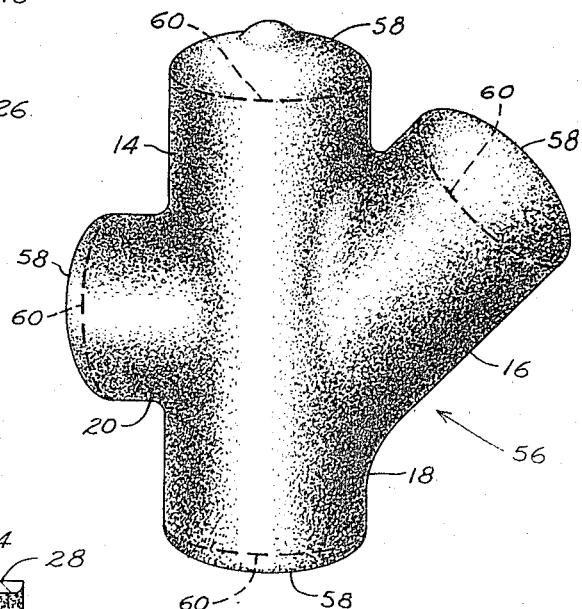
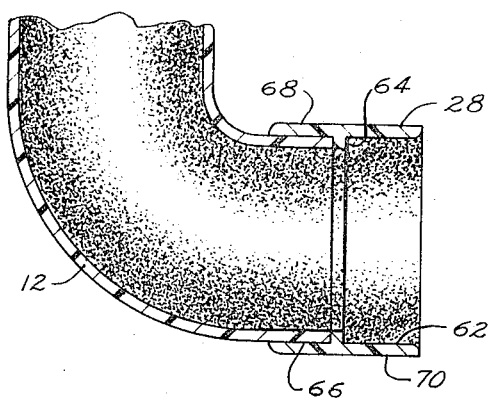
INVENTOR
MARTIN A. USAB
BY Laurence R. Hefter
ATTORNEY Dec. 13, 1966
M. A. USAB
3,291,670
METHOD OF MAKING PLASTIC PIPE FITTINGS
Filed Dec. 2, 1965
2 Sheets-Sheet 2
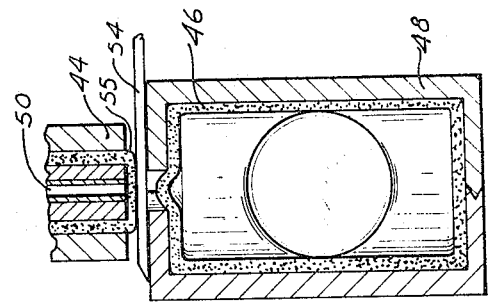
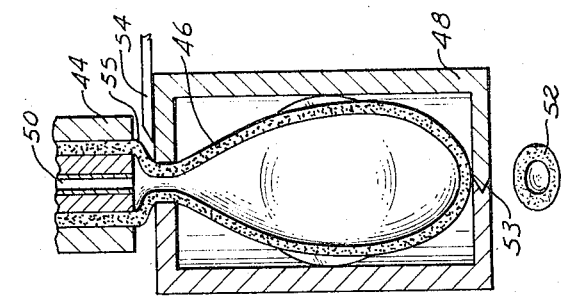
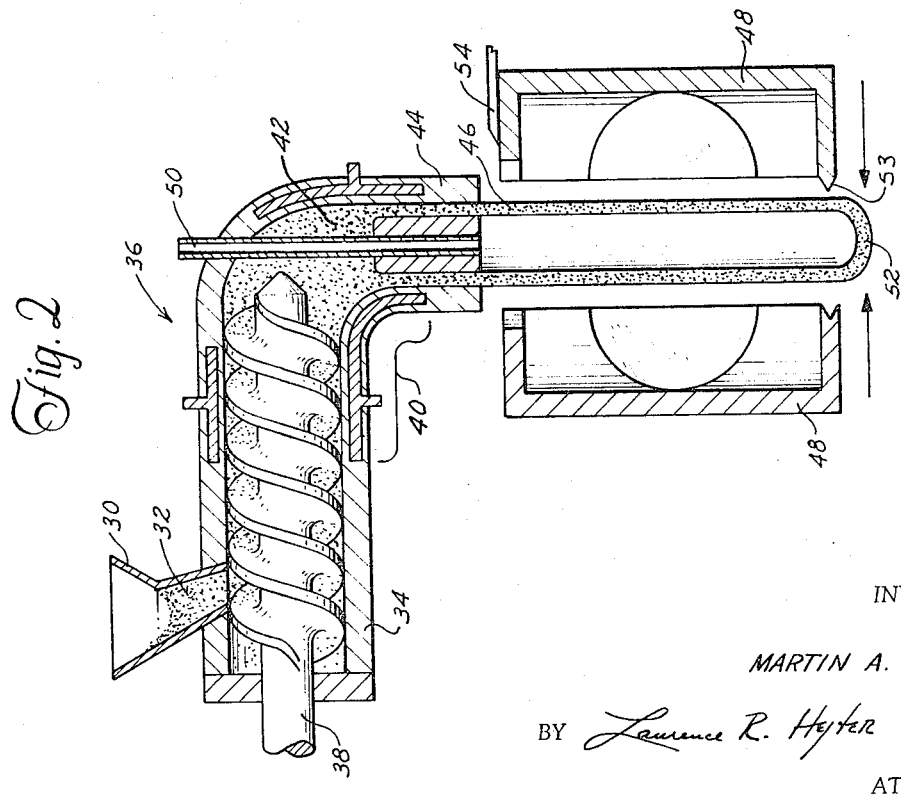
INVENTOR
MARTIN A. USAB
BY *Lawrence R. Heyter*
ATTORNEY United States Patent Office 3,291,670
Patented Dec. 13, 1966

3,291,670
METHOD OF MAKING PLASTIC PIPE FITTINGS
Martin A. Usab, Costa Mesa, Calif., assignor to Atlantic Research Corporation, Fairfax County, Va., a corporation of Virginia
Filed Dec. 2, 1965, Ser. No. 511,176
3 Claims. (Cl. 156—245)

This is a continuation-in-part of application Serial Number 332,435, filed December 23, 1963, entitled Plastic Pipe Fitting and Method of Manufacture, filed by the same inventor, and now abandoned.

This invention relates to an improved construction of and method for making synthetic resin pipe fittings, and, more particularly, to a technically desirable and economical pipe fitting and method of making the fitting of a combination of parts manufactured by different processes.

In fluid flow systems, it is essential that the mating surfaces of the pipe and the fittings be compatible so that fluid-tight joints can be made. According to long established practice pipes are received internally by pipe fittings and, therefore, the mating surfaces are the external surface of the pipe and the internal surface of the fittings. Present day code standards for pipe recite required external dimensions and surface finish and for pipe fittings recite required internal dimensions and surface finish, and absent major code revisions, fittings must be made in accordance therewith.

Presently, a great majority of synthetic resin pipe fittings, hereinafter referred to as plastic pipe fittings, are mass produced by injection molding since this process produces a fitting having the specified dimensional tolerances and a satisfactory surface finish. While injection molding is very satisfactory for certain types of fittings, it is unsatisfactory for fittings having relatively complex geometrical configurations. Injection-moldable fitting configurations are limited to those that can be internally cored and, since the cores must be easily removed, many limitations are placed upon the fitting shapes and contours. Theoretically preferred shapes for proper fluid flow often cannot be efficiently manufactured by injection molding, thus requiring a compromise in design for manufacturing efficiency. Furthermore, since injection molding is a high pressure process, the safety precautions required in equipment design and machine operation are extensive. Other disadvantages of injection molding are the high tooling cost due to the expense of making high pressure precision molds and cores, the operational expense of inserting and removing the cores and the time lost due to the insertion and removal of the cores.

To overcome these disadvantages, many attempts have been made to adapt conventional hollow article forming methods to the manufacture of plastic pipe fiittings but previous attempts have failed to produce an economical and technically acceptable pipe fitting. One example of such a conventional method is known as "blow molding" wherein a tubular parison is formed and immediately surrounded by a split female mold. As the mold closes about the parison, air is introduced internally into the parison and forces the parison to conform to the shape of the mold. Cores are not needed to form the hollow structure and any desirable geometrical configuration can be blow molded. However, blow molding has several inherent limitations which prevent the use of this process for producing technically acceptable pipe fittings. The primary limitation is the relative uncontrollability of the internal dimensions and internal surface finish of the blown product. Another limitation is the inability of blow molding to produce internally threaded fittings. A further limitation is the nonuniformity of wall thickness as one proceeds from the central portion of the fitting outwardly along the length of its branches with the outer extremities of the branches having thinner walls than the central portion of the fitting body. In order to provide a fitting having branches complying with code wall thickness requirements, the central portion of the fitting body must exceed these requirements, thereby requiring the use of excessive material.

Other types of hollow article-forming methods, such as slush molding and rotational or centrifugal casting, have many of the advantages of blow molding but also have most of the disadvantages of blow molding referred to above.

Accordingly, it is one object of this invention to provide an inexpensive plastic pipe fitting having a technically correct geometrical configuration for fluid flow.

It is another object of this invention to provide an improved method of manufacturing plastic pipe fittings which eliminates the need for compromising the geometrical configuration of the fittings from the technically preferred shape.

It is a further object of this invention to provide an improved, inexpensive method of manufacturing plastic pipe fittings having difficult to mold geometrical configurations without adversely affecting control of the internal surface finish or dimensions, and which has internal surface aberrations such as threads or grooves.

Briefly stated, this invention, in one form, comprises a plastic pipe fitting formed of a combination of parts, each of which is manufactured in such a manner as to be the most economical method and still provide a technically acceptable part. The invention further provides a method of manufacturing the combination plastic pipe fitting. The fitting is formed of a main portion or body through which fluid flows and a plurality of end connectors or tubular adapters, one end of which is adapted to receive plastic piping. The body is manufactured by blow molding employing a mold having a machined internal surface in order to provide the body with a sufficiently smooth external surface finish to permit proper mating thereon with the end connector. The end connectors are precision-formed, such as by injection molding, in order to provide the connectors with a sufficiently smooth internal surface finish and proper dimensions to ensure a fluid-tight joint with the body. A portion of the end connector is then rigidly joined to the main body by any conventional plastic joining means such as solvent welding. The remaining portion of the end connector extends outwardly from the body to receive the plastic piping to which the fitting is to be attached. The resulting plastic pipe fitting has the required internal dimensions and surface finish at the portions thereof which are to be joined to the plastic piping as are required to provide a fluid-tight joint therewith and yet the body, which may have a relatively complex geometrical configuration, is manufactured without the use of internal cores, thus reducing the cost of manufacture as well as permitting the design of the technically desirable geometrical configuration of the body.

The preferred embodiment of this invention is illustrated in the following drawings in which:

FIGURE 1 is a perspective view of a plastic pipe fitting formed in accordance with this invention, FIGURE 2 is a sectional schematic representation of apparatus for carrying out the method of this invention for making the body of a plastic pipe fitting illustrating the initial step in the manufacturing process, FIGURE 3 is a partial sectional schematic representation of the molding apparatus illustrating an intermediary step in the manufacture of the body of a plastic pipe fitting of this invention, FIGURE 4 is a partial sectional schematic representation of the molding apparatus illustrating the final molding step in the manufacture of the body of a plastic pipe fitting in accordance with this invention, FIGURE 5 illustrates the molded body portion of a plastic pipe fitting formed in accordance with this invention in its form upon completion of the molding process, and FIGURE 6 is a fragmentary sectional view of a pipe fitting formed in accordance with this invention illustrating a portion of the body welded to a precision-formed end connector.

Adverting now to the drawings and, more specifically, to FIGURE 1, there is illustrated a plastic pipe fitting 10 formed of a main body 12 having a plurality of branches 14, 16, 18, 20 on the remote end of each of which is mounted an end connector or pipe adapter 22, 24, 26, 28, respectively. The particular configuration of the pipe fitting 10 is merely for illustrative purposes and it should be understood that any pipe fitting shape can be formed in accordance with this invention, albeit the invention finds its most advantageous use in a multiple branched fitting such as illustrated in FIGURE 1. As used throughout this description and appended claims, the term "branch" refers to each arm of a fitting. For example, an elbow fitting is considered as having two branches while the fitting 10 illustrated in FIGURE 1 has four branches, i.e., branches 14, 16, 18 and 20. Again, for illustrative purposes only, several types of end connectors are illustrated, specifically a threaded end connector 22, an O-ring seal end connector 24, and welding socket type end connectors 26, 28. In practice a pipe fitting usually employs one type of end connector; however, this invention permits different types of connectors to be used, if desired.

The fitting body 12 is made by the hollow article forming process known as "blow molding." Blow molding provides an article having a smooth exterior surface finish and permits close control of the external dimensions. However, the disadvantages of blow molding are that the internal surface finish often is not sufficiently smooth to permit fluid-tight joints to be formed therewith, the internal dimensions cannot be held within precision tolerances and the wall thicknesses often are not uniform throughout the entire blow molded article. However, as will be shown below, these disadvantages are immaterial in a pipe fitting formed in accordance with this invention.

FIGURES 2 through 4 schematically illustrate a blow molding machine and successive steps in the blow molding of the pipe fitting body 12. While the process of blow molding is well known, a brief description here is warranted to facilitate understanding of the advantages inherent in the product and method of this invention. The blow molding apparatus basically includes a material supply source, such as hopper 30, which directs the flow of synthetic resin 32 in powdered or pelleted form into a housing 34 of an extrusion machine 36. A screw type conveyor 38 forces the synthetic resin 32 forward through a heating section 40 where the resin is plasticized. The plasticized material 42 is then forced through a die 44 from which it emerges in a semi-rigid tubular form referred to as a parison 46. The viscosity of the plasticized material must be sufficiently high to enable the parison 46 to maintain its shape and wall thickness until it is molded into final form and solidified by cooling.

As may be seen in FIGURE 2, a split mold 48 receives the parison 46. The mold 48 closes around the parison and air pressure is applied to the interior of the parison 46 through an air tube 50 in order to blow the plasticized parison into contact with the interior of the mold 48 (FIGURES 3 and 4). In order to remove the heavy bottom portion 52 of the parison 46 the mold 48 is provided with a pinching blade 53 such that upon closing of the mold 48 the bottom 52 is removed thus providing a new, uniform bottom. Upon conclusion of the blowing, a knife 54 severs the blown product from the remaining extrudate 55. The resultant blown product 56, illustrated in FIGURE 5, is then removed from the mold 48 and cooled to sufficiently solidify the fitting body to obviate the formation of any imperfections in the surface which might result from handling. The resultant blown product 56 is formed with end portions 58 closing the ends of the branches 14, 16, 18, 20. These end portions are removed by any satisfactory machining process such as sawing, grinding, or cutting in order to provide the branches with an end face normal to a longitudinal axis through each of the branches, the end face being represented by the dashed lines 60.

Because the end connectors 22, 24, 26, 28 are in contact with the external surface of the branches 14, 16, 18, 20, respectively, it is imperative that the external surface adjacent the ends of the branches be accurately dimensioned and have a sufficiently smooth surface finish to permit fluid-tight joining of the end connectors to the branches. Such requirements are fulfilled by manufacturing the cavity of the mold 48 with a machined surface of proper dimensions taking into account the shrinkage factor for the particular synthetic resin to be molded.

The end connectors 22, 24, 26, 28 are produced by a method which provides precision internal surfaces and which can provide an internal surface having threads such as shown in connector 22, or grooves such as shown in connector 24. One example of such a process is machining extruded stock; however, a more common process is injection molding wherein plastic granules are heated until melted and the melt is then forced under pressure into a mold where it cools and solidifies to produce a part of the desired shape. Since the end connectors are basically cylindrical members, the use of cores is no problem as their removal is very simple and can be performed on automatic equipment. The accuracy of internal dimensions and the smoothness of surface finish is provided by the cores as are the internal surface aberrations, such as threads and grooves. As shown in FIGURE 6, it is desirable to provide the inner wall 62 of an end coupling (represented by end coupling 28) with an annular inwardly projecting abutment 64 perpendicular to the inner wall 62. The abutment 64 facilitates producing a joint between the pipe fitting 10 and a pipe (not shown) which obviates the formation of pockets which would entrap fluids and solids thereby contaminating the pipe system and substantially restricting the free flow of fluids therethrough. Injection molding is ideal for providing such an internal abutment.

By the above manufacturing methods, the mating surfaces of the fitting body 10 and the end connectors, i.e., the external surface 66 of the branches 14, 16, 18, 20 and the internal surface 62 of the connectors 22, 24, 26, 28 are precision-formed and, therefore, have the proper dimensions and surface finish to permit a fluid-tight joint to be formed therebetween. The end connectors are joined to the branches by any conventional plastic joining means such as chemical welding, for example, solvent or adhesive; heat and pressure welding, for example, induction or spin welding; ultrasonic welding; or mechanical joining such as threading, expanding, upsetting, swedging and the like. The only controlling factor is the sufficiency of the fluid-tight joint formed thereby.

As is shown in FIGURE 6, the end connector 28 is attached to the end of the branch 20 remote from the central portion of the body 12 in such a manner that a first portion 68 of the connector extends over the branch 20 while a second portion 70 of the connector extends outwardly beyond the end of the branch. The second portion 70 provides a socket to receive a pipe and, consequently, is formed with the required surface finish and dimension tolerance. The dimensions of the second portion 70 need not be the same as the dimensions of the first portion thereby allowing the fitting to serve as a reducer or expander.

The fitting body 10 and the end connectors 22, 24, 26, 28 may be fabricated from any synthetic resin or plastic such as high impact polystyrene, polyethylene, polypropylene, acrylonitrile-butadiene-styrene (ABS) or polyvinyl chloride (PVC). The body and the end connectors may be formed of the same material or they may be of different materials.

The above method for making a plastic pipe fitting and the resultant fitting has many advantages over present day methods and fittings. Of primary interest is the ease of forming properly shaped fitting bodies having geometrical configurations designed for most efficient fluid flow therethrough without having to be concerned with the removal of cores upon formation of the fitting body. Concomitant with this advantage is the decrease in expense required to form the fitting body since elimination of cores also eliminates core fabrication expense which is high as is the expense of processing including insertion and removal of the cores. Blow molding is a low pressure operation whereas injection molding requires extremely high pressures and corresponding safety precautions in equipment design and machine operation for handling these high pressures. Additionally, wall thicknesses of plastic pipe fittings may be easily varied by blow molding techniques while maintaining constant outside dimensions by merely building up the wall thickness internally, thereby permitting a wide range of wall thicknesses of completed pipe fittings by simple adjustment of the parison extruder. This eliminates the need for expensive tooling changes required in injection molding where variation in wall thickness requires either additional cores or modification of the existing cores.

The advantages provided by the combined pipe fitting of this invention are numerous including the efficiency in manufacturing a single line of fitting bodies to which can be attached various end connectors, thereby providing a wide range of pipe fittings from a single fitting body mold. Additionally, attachment of the end connector to the body branches reduces the necessary branch length for the completed blow molded fitting, and, accordingly, reduces the blow-up ratio in the blow molding process. A lower blow-up ratio provides a more uniform wall thickness. Again, by using end connectors, one achieves the manufacturing efficiencies of blow molding while still providing pipe fittings having threaded or grooved internal surfaces which are not obtainable by blow molding.

While the above discussion of forming the fitting body 12 has been directed to the blow molding process, it should be noted that other hollow article forming methods may be used. One alternative is slush molding, wherein a liquid synthetic resin or plastic is poured into a split mold and surplus plastic is then removed leaving a coating on the inside of the mold which is then fused by heating and subsequently cooled to solidify the plastic. Several pouring operations can be employed thereby increasing the wall thickness. Other alternatives are rotational or centrifugal casting, whereby a closed mold is filled with a suitable synthetic resin and rotated or spun about at least two planes in order to distribute evenly the synthetic resin over the inside walls of the mold. The resultant coating is fused by heat, the mold is cooled, and the finished product is then removed. It is obvious that each of these methods produces a product similar to the blow molding method in that the external dimensions and surface finish are accurately controlled, whereas the internal dimensions and surface finish cannot be considered to have a similar degree of accuracy.

While specific embodiments have been shown and described above, it will be obvious to those skilled in the art that various changes and modifications may be made without departing from the invention in its broader aspects. Therefore, it is intended in the appended claims to cover all such changes and modifications as fall within the true spirit and scope of this invention.

What is claimed as new and desired to be secured by Letters Patent of the United States is:

1. A method of making plastic pipe fittings for piping systems requiring fluid-tight joints comprising the steps of
    a. providing a female mold having a cavity with the shape of the fitting desired, said cavity having a machined finish,
    b. molding within said mold a hollow plastic body having at least one branch, forming said body with an external surface adjacent the end of said branch with a finish sufficiently smooth to permit fluid-tight sealing engagement therewith and having precise, accurately controlled dimensions,
    c. forming a plastic end connector with a first portion having an internal surface complementary in size, shape and finish to the external surface of the end of said branch and with a second portion providing a pipe-receiving socket having an internal surface with a finish sufficiently smooth to permit fluid-tight sealing engagement therewith and having precise accurately controlled dimensions,
    d. placing said first portion of said end connector over the end of said branch such that the internal surface of said first portion mates with the external surface of said branch and said second portion of said end connector extends beyond said branch, and
    e. fluid-tight sealingly joining said first portion to said branch.

2. A method of making plastic pipe fittings for piping systems requiring fluid-tight joints comprising the steps of
    a. providing a split female mold having a cavity with the shape of the fitting desired, said cavity having a machined finish,
    b. blow molding within said mold a hollow, plastic body having a plurality of hollow, intercommunicating branches the ends of which have a closure thereon, forming said body with an external surface adjacent the ends of each of said branches with a finish sufficiently smooth to permit fluid-tight sealing engagement therewith and having precise, accurately controlled dimensions,
    c. removing said closure from the ends of said branches,
    d. molding a plurality of plastic end connectors each having a first portion with an internal surface complementary in size, shape and finish with the external surface adjacent the ends of said branches and having a second portion providing a pipe-receiving socket having an internal surface with a finish sufficiently smooth to permit fluid-tight sealing engagement therewith and having precise, accurately controlled dimensions,
    e. placing said first portion of one of said end connectors over the end of each of said branches such that the internal surface of said first portion mates with the external surface of the respective branch and said second portion of said end connector extends beyond said branch, and
    f. fluid-tight sealingly joining each of said first portions to its respective branch.

3. A method of making plastic pipe fittings as defined in claim 2 wherein said molding of said connectors is performed by injection molding.

References Cited by the Examiner
UNITED STATES PATENTS

| | | | |
|---|---|---|---|
| 825,589 | 7/1906 | Dixon | 156—294 |
| 1,497,952 | 6/1924 | Smith | 156—294 X |
| 1,974,337 | 9/1934 | Magnani | 156—245 |
| 1,979,470 | 11/1934 | Johnston | 156—245 |
| 2,601,266 | 6/1952 | Ducatman et al. | 156—294 X |
| 2,680,632 | 6/1954 | Spieth | 285—150 |
| 2,721,159 | 10/1955 | Johnston | 156—242 X |
| 2,751,237 | 6/1956 | Conley | 156—245 X |
| 3,121,577 | 2/1964 | Merriman | 285—150 |

EARL M. BERGERT, *Primary Examiner.*

H. ANSHER, *Assistant Examiner.*